(No Model.)
G. A. CASSAGNES.
SYSTEM OF SYNCHRONISM FOR TELEGRAPHY.
No. 368,931. Patented Aug. 30, 1887.
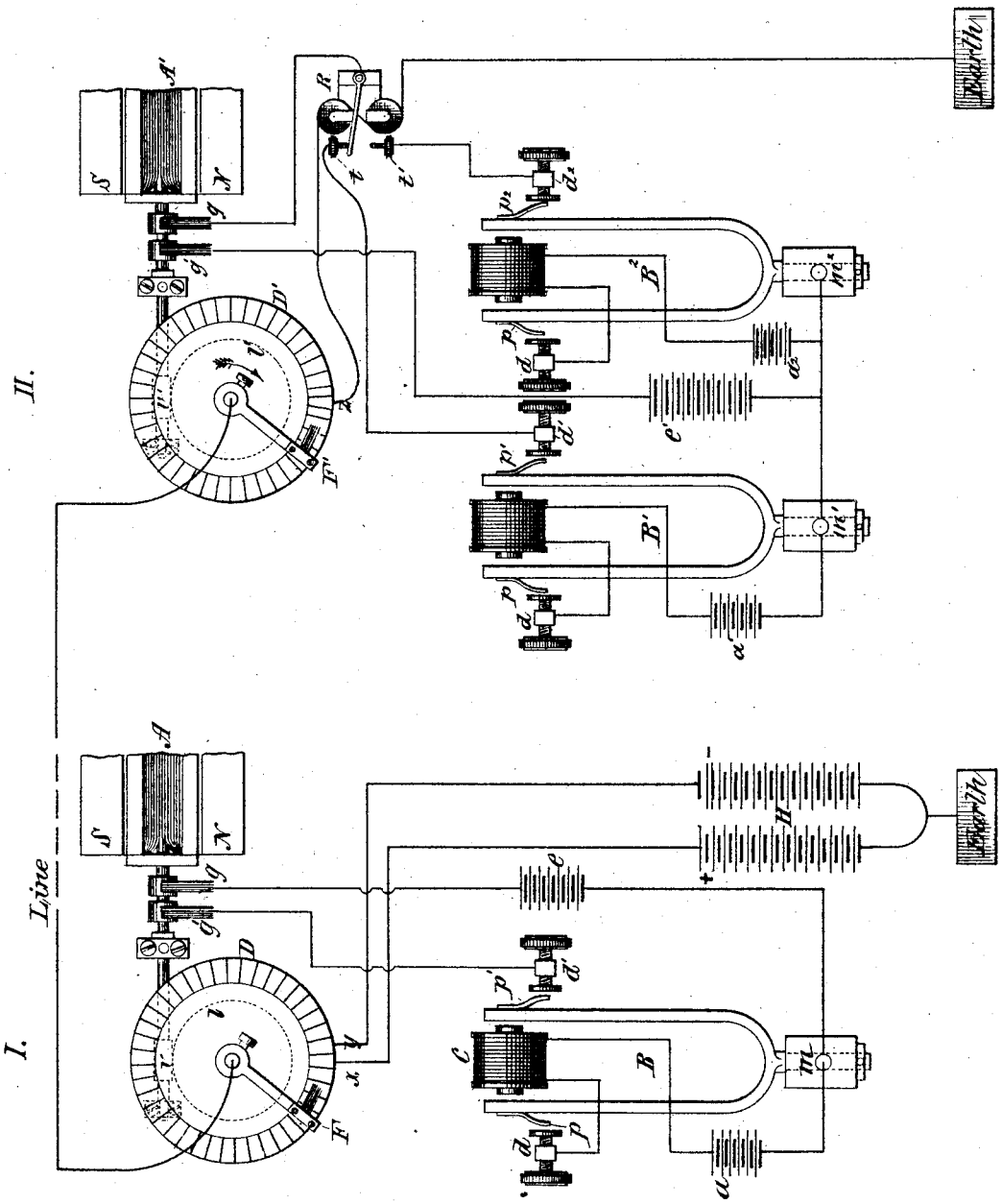
WITNESSES:
Gustave Dieterich
T. F. Bourne.
INVENTOR
G. A. Cassagnes
BY
Briesen & Steele
ATTORNEYS.

UNITED STATES PATENT OFFICE.

GILBERT ALFRED CASSAGNES, OF PARIS, FRANCE.

SYSTEM OF SYNCHRONISM FOR TELEGRAPHY.

SPECIFICATION forming part of Letters Patent No. 368,931, dated August 30, 1887.

Application filed March 25, 1887. Serial No. 232,447. (No model.)

*To all whom it may concern:*

Be it known that I, GILBERT ALFRED CASSAGNES, civil engineer, of Paris, in the Republic of France, have invented a new System of Synchronism for Telegraphy; and I do hereby declare that the following is a full and exact description thereof, reference being made to the accompanying drawing.

Sundry systems of synchronism now used in multiplex telegraphy are based on mechanical transmissions acted upon by correcting-currents sent from one station to another; others on changes in the speed of a vibrating body produced electrically—as in an electro tuning-fork, for instance—by means of correcting-currents sent on the line, in order to synchronize the motion of two trailing fingers or rubbing contact-makers rotating on two circular switches placed at two distant stations.

In the first case—that of synchronism by means of mechanical transmissions—the receiving trailing finger can either receive successively an accelerating or a retarding motion necessary for synchronizing, or, as it is more often the case, can receive an accelerating motion only or a retarding motion only, the trailing finger of the transmitting-station being so adjusted that it moves always slower or always quicker than the trailing finger of the receiving-station.

In the second case—that of synchronism by means of electro tuning-forks—two of these instruments are made use of, each regulating the speed of one of the trailing fingers. One of these electro tuning-forks is kept automatically at the speed of the first by means of changes in the current which keeps it vibrating. Such is, for instance, the case with the synchronism system by means of the phonic wheel of Poul la Cour; but in this last case there are several disadvantages, due to the necessity of having to vary the speed of an electro tuning-fork by means of changes in the current that keeps it vibrating. First, it necessitates the use of tuning-forks with thin prongs, so as to easily obtain sufficiently marked changes in their pitch by means of resistances automatically inserted into or cut off from the circuit of their electro-magnets. These thin tuning-forks will naturally frequently get out of adjustment through the weakening or polarization of the batteries, changes of temperature, &c. Second, these sudden changes of speed in the vibrations of an electro tuning-fork as it passes from a relatively low to a relatively high pitch, or inversely, cause very troublesome irregularities for the instantaneousness of the effect to be produced.

My system of synchronism results from the combination of the various conditions above enumerated, (viz., mechanical transmissions and the use of electro tuning-forks,) in order to obtain a more instantaneous and, chiefly, a more stable result. Its object is the production on the trailing finger at the receiving-station of an accelerated or a retarded motion, according to the wants, and also to avoid the disadvantages of electro tuning-forks with variable speeds by the use of tuning-forks as massive as may be desired, the pitch of which may be theoretically unvarying and the number of vibrations of which shall be determined once for all for each one. Such is now the principle according to which my electro tuning-forks are combined. One of them—placed at the transmitting-station, for instance—governs the speed of a small electromotor, as shall be explained farther on, and through it the speed of a trailing finger connected with the line-wire and rotating on a circular switch.

At the receiving-station are placed two electro tuning-forks, the first of which vibrates a little quicker and the second a little more slowly, but of the same quantity in excess or in deficiency in each case than that at the transmitting-station. These last tuning-forks can each in its turn govern the speed of a second electromotor, which communicates its motion to a second trailing finger connected to the line-wire and rotating on a circular switch similar to that at the transmitting-station. The connections are made in such a manner that according as the trailing finger at the transmitting-station turns a little quicker or a little more slowly than that at the receiving-station correcting-currents, negative or positive, will be sent through the line and will act at the receiving-station on a polarized relay. This polarized relay will then close, through the electromotor, the circuit connected to tuning-fork 1 or to tuning-fork 2, so that the electromotor, and therefore the trailing finger rotating on the circular switch, will be automatically accelerated or retarded. These actions will be repeated each time there is a marked difference between the relative positions of the trailing fingers at the two stations. The receiving trailing finger will therefore be kept at a mean speed, which will establish an almost absolute synchronism between the two stations. This synchronism can be made as perfect as can be desired by making the differences in excess or in deficiency between the electro tuning-forks at the receiving-station and that at the transmitting-station sufficiently small and equal to one another in absolute measurement.

The new arrangement of synchronism comprises, therefore, (a) the use of a single electro tuning-fork at the transmitting-station; (b) the use of two electro tuning-forks at the receiving-station, each one of these three electro tuning-forks making an unvarying number of vibrations, adjusted beforehand according to the degree of sensitiveness which it is desired to arrive at in the correction; (c) the use of electromotors of any description acting on mechanical organs which transmit to the trailing fingers the speeds which these motors receive from the electro tuning-forks by which they are governed. This combination is therefore entirely different, for these various reasons, from the arrangements proposed until now for the same result, and, among others, from the synchronism obtained by means of the phonic wheel.

I shall now give a complete description of one of the arrangements of apparatus and circuits which can be made use of, and of their working, as well as of the explanation of the drawing which is annexed to this specification.

The drawing represents the arrangement of a system of synchronism established electrically between two distributing circular switches, D and D', placed at two distant stations, I and II, and connected by means of a line-wire.

At station I an electro tuning-fork, B, is kept in vibration by means of a local battery, $a$, the current of which passes through the coil C of the electro-magnet of the tuning-fork. One of the poles of battery $a$ is connected at $m$ with the mass of the tuning-fork, and the other pole with one of the extremities of electro-magnet C. The other end of the wire on C is connected with the contact-making screw $d$, which can be screwed up until it touches a small platinum spring, $p$, attached to one of the prongs of tuning-fork B. When this contact is made, the circuit of battery $a$ is closed. The electro-magnet attracts the prongs of the tuning-fork; but this attraction breaks the contact between $d$ and $p$. The circuit is then open, and the prongs, no longer attracted by the electro-magnet C, come back to their original position. The spring $p$ touches again the screw $d$, and the same actions taking place, the tuning-fork is kept in a state of continuous vibration. The other prong of the tuning-fork is also provided with a small platinum spring, $p'$, which at each vibration makes a contact with the screw $d'$. The vibrations thus establish successive makes and breaks of the circuit of a second local battery, $e$, one of the poles of which is connected with the mass of the tuning-fork at $m$. The other pole is connected by means of brush $g$ with one end of the wire on the armature A of a small electromotor, the magnetic field of which is formed by the branches N S of a permanent magnet. The current, after having traveled in the armature, comes back through a second brush, $g'$, to the contact-screw $d'$, passes thence through the spring $p'$, and through the mass of the tuning-fork. The successive currents thus sent through armature A of the motor will cause it to rotate at a uniform speed, determined by the pitch of the vibrations of the tuning-fork. In the case of the motor shown on the drawing, the speed will be of one complete turn per vibration or per current sent through the armature.

The spindle of the motor rotates, by means of proper gearing or of any other mode of mechanical transmission, a trailing finger, F, which travels successively on the contacts of the circular switch D, which are used for the transmission of telegraphic signals. On the drawing the spindle of the motor is prolonged and carries a worm, $v$, which gears with a toothed wheel, $l$, keyed on the axle of the trailing finger F. This trailing finger is thus rotated at a constant speed on the circular switch D. The trailing finger F' at station II is also kept in rotation on a circular switch, D', by means of a small electromotor, A'. This motor receives the current of a local battery, $e'$, rapidly interrupted through one or other of two electro tuning-forks, B' and B². The tuning-fork B' vibrates a little quicker and the tuning-fork B² a little more slowly than the tuning-fork B at station I. These two tuning-forks are also kept in a state of continuous vibration by means of two local batteries, $a'$ and $a^2$, as that of station I.

The battery $e'$ is connected on one side with the masses $m'$ and $m^2$ of B' and B², and on the other with the brush $g'$ of the motor A'. The current passes through A', through brush $g'$, through the armature of a polarized relay, R, through one of the two abutting-screws $t$ or $t'$ of that relay, and through one of the two contact-screws $d'^1$ or $d'^2$, according as the armature of the relay rests on $t$ or on $t'$. The motor A' will therefore receive the interrupted currents due to the vibrations of B' or to those of B², and will rotate a little quicker or a little more slowly than motor A at station I, according as the armature of the relay rests on $t$ or on $t'$. The trailing finger F' will therefore rotate either a little quicker or a little more slowly than trailing finger F at station I.

The two distributing circular switches D and D' are similarly divided, except the following difference: The space taken up on D by the two contacts $x$ and $y$ is divided on D' into three contacts. The contacts $x$ and $y$ are respectively connected with the positive and negative poles of a line-battery, H, the middle of which is put to earth. Contact $z$ on circular switch D' (the middle one of the three mentioned above) is connected with one of the extremities of the coils of the polarized relay R, and the other extremity of the coils is put to earth.

The two trailing fingers F and F' turn at unequal speeds. There will therefore happen a moment when the trailing finger F will be on one of the two contacts $x$ and $y$, while F' is on $z$. At that moment a current will pass through the line, (positive or negative, according as F shall be on $x$ or on $y$,) through contact $z$, and through the coils of the polarized relay R. This current will throw the armature of this relay on one or other of the abutting-screws $t$ or $t'$, according as F is losing or gaining on F'. The speed of motor A', and consequently that of F', will immediately be altered, and the repetition of these actions will keep F and F' in an almost absolute synchronism, provided the differences between the speeds of vibration of the tuning-forks are sufficiently small.

As I have already stated, the motor makes one complete revolution for each vibration of the tuning-fork. In case tuning-forks of high pitch should be employed, it is easy, so as not to increase unduly the speed of the motor, to use certain arrangements to reduce it. For instance, motors with several magnets arranged round the armature can be made use of. If, for instance, the motor has four magnetic poles, it will make only half a revolution for each vibration. If it has six poles, it will make one-third of a revolution, and so on.

To sum up, after having thus described the principle and the nature of my invention for a new system of electrical synchronism for the uses of multiplex telegraphy, I make the following claim:

The combination of an electro tuning-fork, B, electromotor A, trailing finger F, distributing-switch D at one station, with two electro tuning-forks, B' and B², of unvarying speeds of vibration, vibrating the one quicker and the second more slowly than the fork B, second electromotor, A', trailing finger F', and distributing-switch D' at a second station, all arranged so as to maintain both trailing fingers in a state of synchronism, both stations being connected by means of a single line-wire, as specified.

GILBERT ALFRED CASSAGNES.

Witnesses:
ROBT. M. HOOPER,
ALPHONSE BLÉTRY.